United States Patent [19]

Jahn

[11] 3,998,206
[45] Dec. 21, 1976

[54] SYSTEM FOR COLLECTING AND UTILIZING SOLAR ENERGY

[76] Inventor: Arnold Jahn, 1124 N. Elm St., Fairmont, Minn. 56031

[22] Filed: Aug. 23, 1974

[21] Appl. No.: 500,061

Related U.S. Application Data

[63] Continuation-in-part of Ser. No. 393,561, Aug. 31, 1973, Pat. No. 3,905,352.

[52] U.S. Cl. .................................. 126/271; 60/641
[51] Int. Cl.² ............................................ F24J 3/02
[58] Field of Search .................. 126/270, 271, 400; 237/1 A; 165/104 M; 60/641

[56] References Cited

UNITED STATES PATENTS

| 787,145 | 4/1905 | Brown | 126/271 |
|---|---|---|---|
| 811,274 | 1/1906 | Carter | 126/271 |
| 2,920,710 | 1/1960 | Howard | 126/270 |
| 3,799,144 | 3/1974 | Ramsey | 126/270 |
| 3,905,352 | 9/1975 | Jahn | 126/270 |

FOREIGN PATENTS OR APPLICATIONS

| 627,431 | 10/1927 | France | 126/270 |
|---|---|---|---|
| 325,179 | 2/1930 | United Kingdom | 126/270 |

*Primary Examiner*—Kenneth W. Sprague
*Assistant Examiner*—James C. Yeung

[57] ABSTRACT

A novel and simplified system and apparatus is disclosed herein for efficiently collecting and utilizing solar energy. Fundamentally the invention employs a reflector-supporting medium or frame which is mounted for orbital travel through a circular path extending transversely (preferably horizontally) to the vertical. A large substantially parabolic reflector unit is mounted on said supporting medium for swinging or oscillation, during travel of said support, on an axis extending at least close to the horizontal. A stationary boiler or generator is immovably supported on an upstanding rigid post or tower and has a spherical, exterior, heat-absorptive surface so positioned with relation to the orbital travel of the reflector-supporting medium, and also the up and down swinging of the reflector unit, that all reflected solar rays will be focused and strike against some spherical segment of the absorptive surface throughout the sun's varying trajectory from sunrise to sunset. Preferably, a heat-insulated shield member is employed, surrounding most of the exterior of the spherical boiler and rigidly supported from the reflector unit. This shield has a circular exposure recess which constantly varies its position relative to the boiler exterior during full-day operation of the system. The shield is mounted for free sliding and oscillatory movement relative to the spherical boiler. Sun-sensor tracking media actuates the up and down swinging of the reflector unit in synchronism with the varying elevation of the sun in its daily trajectory.

10 Claims, 8 Drawing Figures

SYSTEM FOR COLLECTING AND UTILIZING SOLAR ENERGY

This application is a continuation-in-part of applicant's co-pending application, Ser. No. 393,561, filed Aug. 31, 1973 which has now matured into U.S. Pat. No. 3,905,352, issued Sept. 16, 1975.

BACKGROUND OF THE INVENTION

Despite the tremendous national need for successful utilization of solar energy, there is to my knowledge no commercially feasible system in use for collecting and utilizing solar energy to significant commercial or municipal advantage. The prior art shows numerous solar collection systems which employ one or more large reflector units generally extending in a parabolic shape. In some instances these reflector units are swung or gyrated through predetermined paths in an attempt to "track" the sun during some span of its daily trajectory. Such reflector assemblies or units are related with boilers or generators upon which, in operation, at least some proportion of reflected solar rays impinge. The boilers in such prior art, to my knowledge, are supported by or connected with the parabolic reflector or its mounting to constantly maintain a predetermined focal relationship. Such combination, while making use of some percentage of the total reflected area, fails to bring about even a near optimum relation of reflector unit, boiler and moving apparatus and in few, if any, cases may the solar rays throughout the full trajectory of the sum be utilized. The position and movable nature of the boiler or generator is one of the great causes of failure of such systems.

Other prior art utilizes a multiplicity of individual (usually flat) mirrors or reflectors mounted on a turntable or track for orbital movement thereon. In such prior art the individual mirrors usually require individual tilting or gyrating operation constantly throughout the operation of the system and during the orbital travel of the group reflectors. Such complex requirements require expensive installation, repair and operation and, as shown in the prior art, are used with boilers or generators which also require movement or position change during the operation of the system.

The requirement by the prior art of generators or boilers which move or change position during operation of the system entails almost always flexible or movable connections between the output hot fluids from the boiler and the transfer medium or storage medium to which the hot fluids are connected. Problems of leakage, weather damage and added space requirement for such apparatus of the prior art has, to my knowledge, made such solar systems impractical and commercially inoperable.

It is the main object of my invention to create and provide a solar ray collection system which requires a minimum amount of space for its installation and operation, as contrasted with the prior art; which permits the most concentrated and compact effective use of the essential components including tiltable parabolic reflector, reflector mounting traveling through orbital path and absorptive burner or boiler. With my improved system as contrasted with the prior art, the heretofore unknown high efficiency of collection of solar rays and transmittal of heat is obtained throughout the full trajectory of the sun from sunrise to sunset and regardless of variations in seasonal trajectories of the sun or geographical location of the system.

My novel system, through new compact relation of essential components and high efficiency of solar collection, is particularly adapted for operation in tandem with conventional power plants which would furnish steam for the turbine operating electrical generators.

The prior art, while usable expensively for partial home or swimming pool heating requirements, is unsuitable even in favorable desert locations of a system for providing power plants which would generate even 200 megawatt capacity with requipment closely placed in 28 square miles of territory.

An object of my invention is the creation and provision of solar ray collection systems which would permit location of at least thirty units per acre and which, in a territory of one square mile would develop, with conventional turbine generator plants, systems with a capacity exceeding 400 megawatts per square mile.

SYNOPSIS OF THE INVENTION

My invention, in its broad conception and distinction from the prior art, employs a large reflector unit which, through grouping of a multiplicity of flat reflectors or by integral formation, constitutes a parabolic reflector unit mounted for up and down limited tilting or swinging movement on a substantially horizontal axis. The extreme upward swinging movement of the reflector unit for receiving solar rays should approximate a position where the axial center of the parabolic reflector is disposed approximately horizontal. The large reflector unit is mounted for up and down swinging on a substantially horizontal axis disposed at a minimal distance of the center of the unit and reflector unit is mounted by a turntable or track action on a mounting which travels through a substantially circular orbital path. I discovered that the extreme downward swinging of the unit in tracking the elevational trajectory of the sun should be approximately where the axial center line of the reflector from horizontal is displaced angularly and at the most about 90°.

I have discovered that with high receptive and absorptive characteristics, a stationary boiler or heat generator may be immovably mounted with its center substantially horizontally aligned with the uppermost oscillated position of the reflector unit.

I employ as a burner or boiler a generally annular housing having a substantially spherical exterior. This burner may be immovably mounted by a vertical post or standard, or may be in rigid manner suspended from above the overall height of the apparatus.

The mounting for the essential reflector unit is independent of the mounting for the boiler but revolves on a substantially vertical axis common with the vertical center line of the exposure area of the boiler. It is usually essential to provide a counterweight connected with brace elements supplied by the reflector unit to nicely balance the mounting and particularly the reflector for its orbital travel.

The spherical outer surface of the burner is constructed of a "black" or solar ray absorptive material throughout most of the contour thereof but in operation only a spherical segment of this exterior is exposed for reception of reflected solar rays. To this end a shield or shutter element of generally spherical contour is supplied having high and efficient heat insulating properties and concentrically surrounding the spherical exterior of the boiler or burner structure. This shield is provided with a spherical section and circular recess which defines the ever-changing exposure area of the boiler proper. The diameter of this recess is calculated on the overall area actually developed by the overall reflected solar rays from the reflector unit. The said shield or shutter is mounted from and rigidly secured to the reflector unit by rigid beams or stays and consequently revolves and gyrates (with free slidable relation) to the boiler during orbital travel as well as upward and downward swinging of the reflector.

With such close combination of essential working parts, the location and distance between reflector and boiler and the diameter and overall height of a working unit of my inventive system is minimized, but still the greatest efficiency of utilization of reflective solar rays is established without requiring any accompanying movement of boiler and its fluid transmitting media during operation.

The boiler may utilize, for heat-absorbing and transferring means, such fluids as water or mercury which is vaporized and/or physically changed to vapor or gas formation by the intense heat collected in the exposure area defined by the ever-changing relationship of the shield. The heat collected by the fluid transfer medium rises to the top of the boiler or heater then passes downwardly with highly insulated conduits to the ground or support of the structure in recircling operation and may be transferred without substantial loss of temperature to a conventional power station located at ground level where the heat is used for multi-purposes, such as preferably for generating steam for a turbine generator plant station adjacent and at ground level.

Sun-sensor mechanism is provided for tracking the sun in the elevational increment of the sun's trajectory from day-to-day and such sensor medium actuates a reversible motor circuit or the like for determining the up and down swinging or oscillation of the reflector unit during its orbital travel.

Motorized mechanical means, taking in contemplation the variance of the sun's trajectory to earth, with day-by-day or monthly differences is synchronized or properly applied to revolve the mounting for the reflective unit through its orbit in direct relation to the overall lengthwise trajectory of the sun's travel during seasonal variances and considering by latitude the geographical location of the system.

Through my experiments and calculations I have determined that with the stationary generally axial relation of the burner and the parabolic reflector unit with travel orbitally and in up and down swingable relation during the entire day's trajectory of the sun from sunrise to sunset, more than 40% of the entire reflective area effectively focuses on the controlled exposure area of the boiler or generator.

DETAILED DESCRIPTION OF THE DRAWINGS

The structure, operation and advantages of my invention will be more fully apparent from the following description made in connection with the accompanying drawings wherein.

Referring specifically to the embodiment of the invention illustrated in the drawings, I provide a suitable mounting, indicated as an entirety by the letter M, which includes specific supporter mounting means for the overall reflector unit R and also a general support mounted for orbital or turntable travel in operation. To such ends, in the form shown, a generally horizontal mounting platform 11 is shown of circular configuration having small flanged wheels 12 pivotally mounted in depending brackets 12a. The wheels are arranged for flanged engagement with a circular track 13 which is suitably supported horizontally upon a building floor or upon the ground. The wheel assembly for each wheel preferably includes a depending substantially vertical flanged finger 14 having an angled tip extremity 14a which underlies the top or head of the rail 13 to prevent separation of the turntable from the track during operation of my system.

The overall reflector unit or assembly R, in the form disclosed, is mounted for generally up and down swinging movement or oscillation on trunnions 15 and 16 which are axially and horizontally aligned and which are each supported on rigid upstanding frame structure 17 and 18. Such frame structure as clearly shown in FIGS. 1 to 3, inclusive, includes medial substantially vertical posts 17a and 18a, respectively, together with elongate diagonal rigid brace rods 17b and 18b. The said frames preferably are further braced and strengthened by suitable shorter diagonal brace elements and by horizontal rigid bars 17c and 18c, respectively.

As shown, the upper ends of the spaced and opposed reflector mounting frames 17 and 18 have rigidly attached thereto upstanding rigid circular plates 19 and 20, respectively, which are provided with suitable bearings (not shown) for the heavy trunnions 15 and 16. Heavy opposed and oppositely aligned end discs 21 and 22 are affixed exteriorly to the reflector assembly or unit R and are disposed concentrically of the circular plates 19 and 20 and, as shown, are keyed or otherwise rigidly affixed to the trunnion members 15 and 16.

Figure 1:
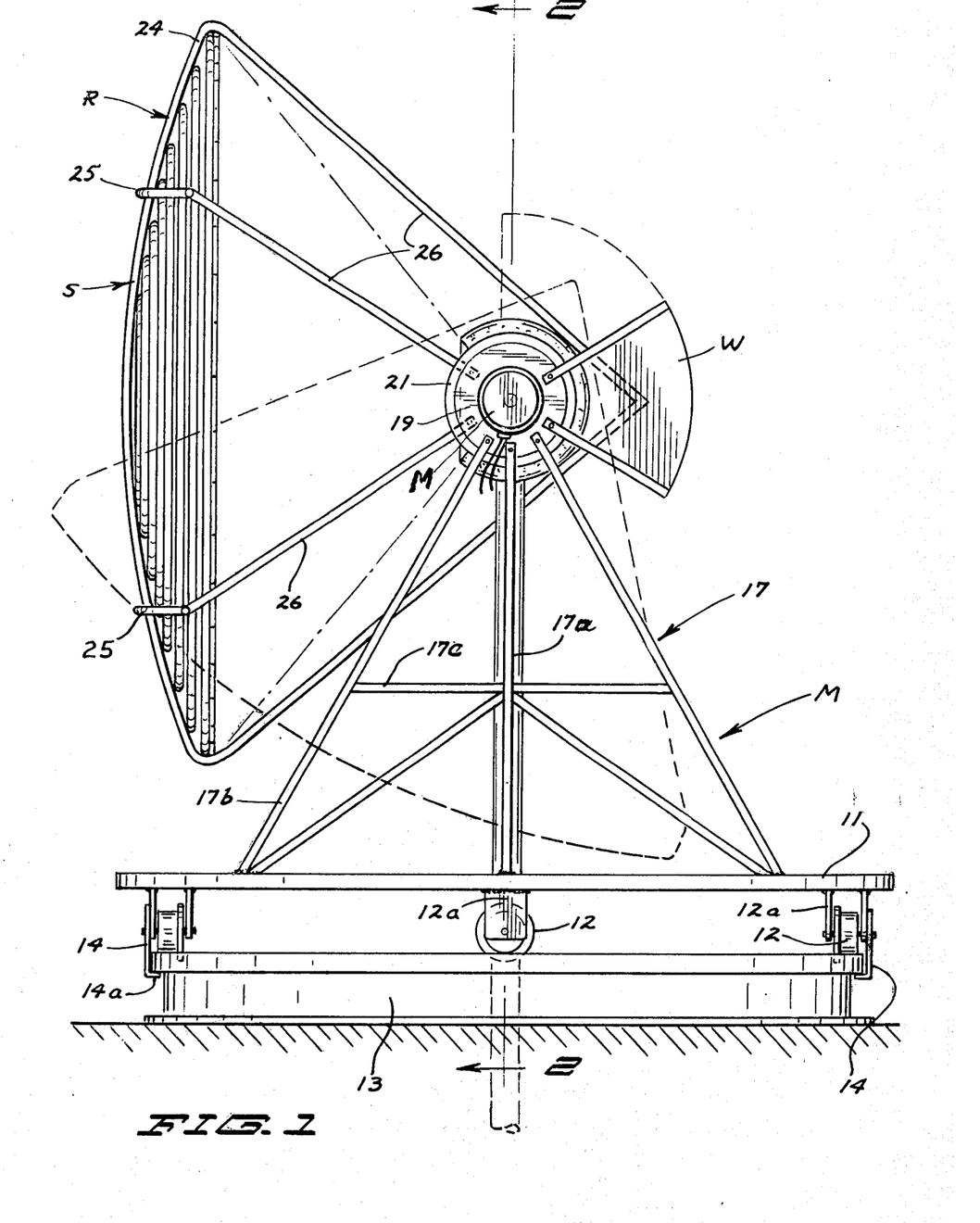
FIG. 1 is a view in side elevation of an embodiment of the invention with dotted lines indicating a medium lower position of the reflector unit.
Figure 2:
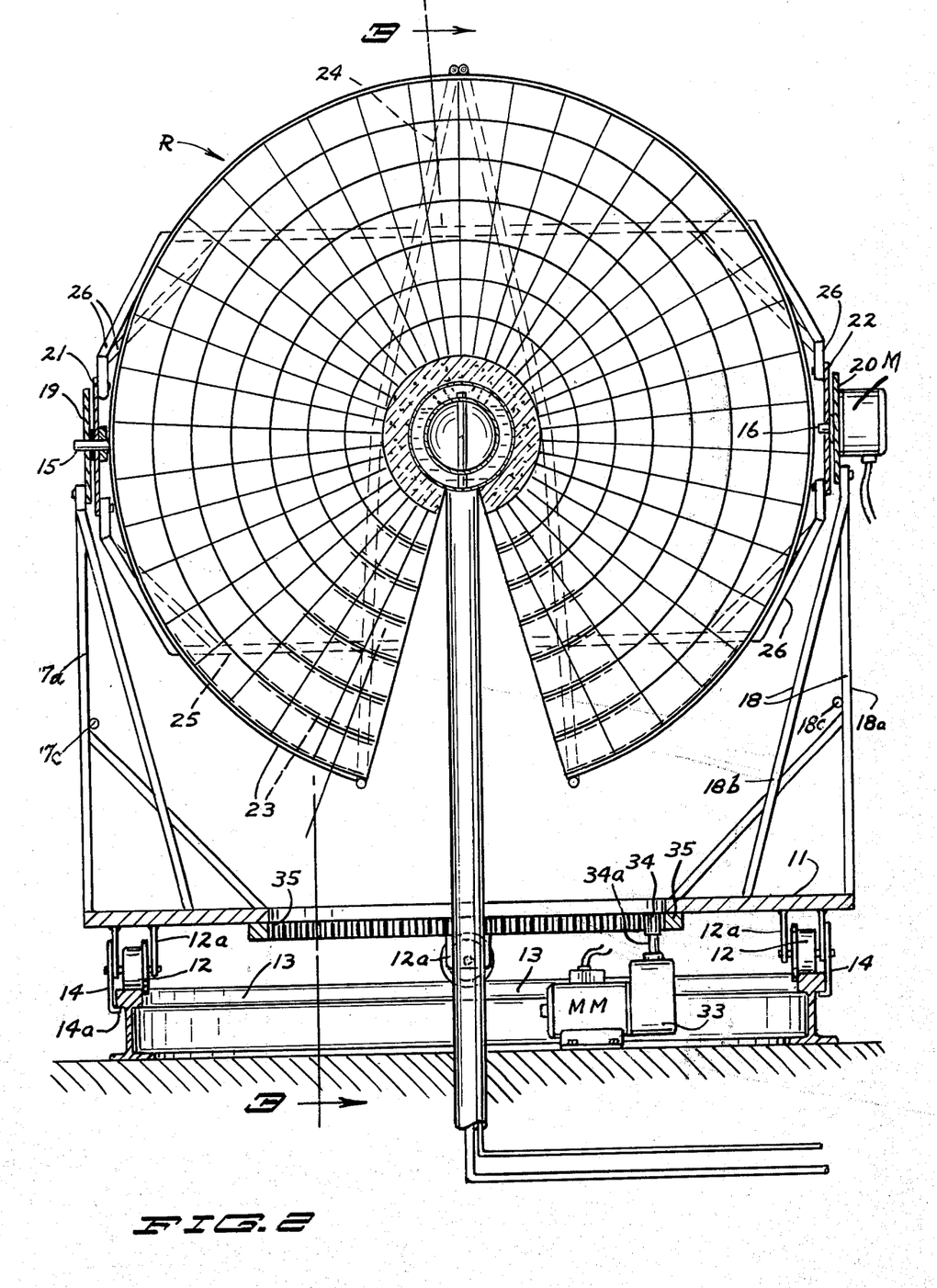
FIG. 2 is a vertical cross section taken along the line 2—2 of FIG. 1.
Figure 3:
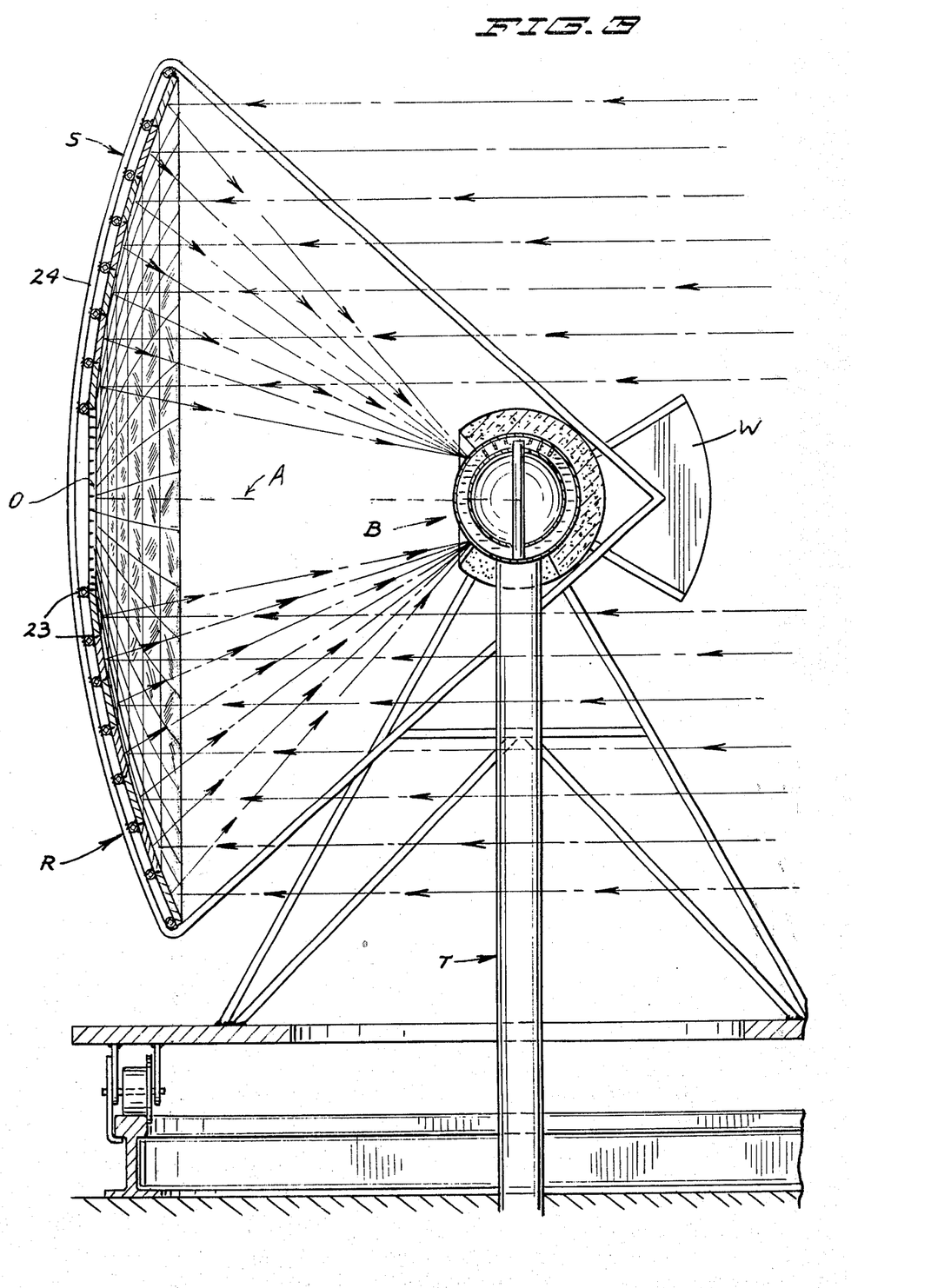
FIG. 3 is a cross section taken along the staggered section line 3—3 of FIG. 2 with the substantially horizontal arrows indicating selected solar rays striking the parabola reflector of my system and with angled or diagonal arrows indicating the reflection of the first mentioned rays in sharp focus on an exposed area of the apparatus boiler or generator.
Figure 4:
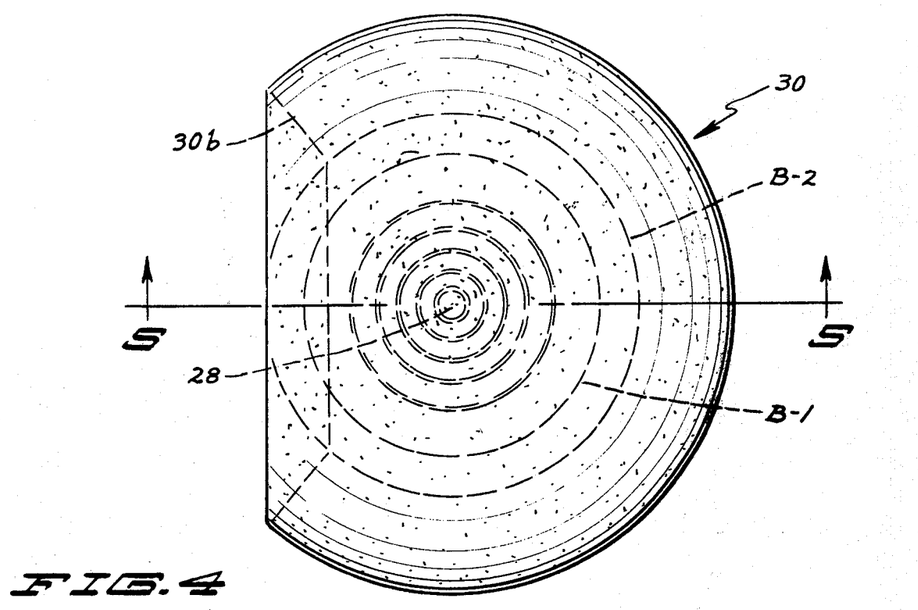
FIG. 4 is a top plan view of the boiler with the movably disposed shutter or shield mounted thereon.
Figure 5:
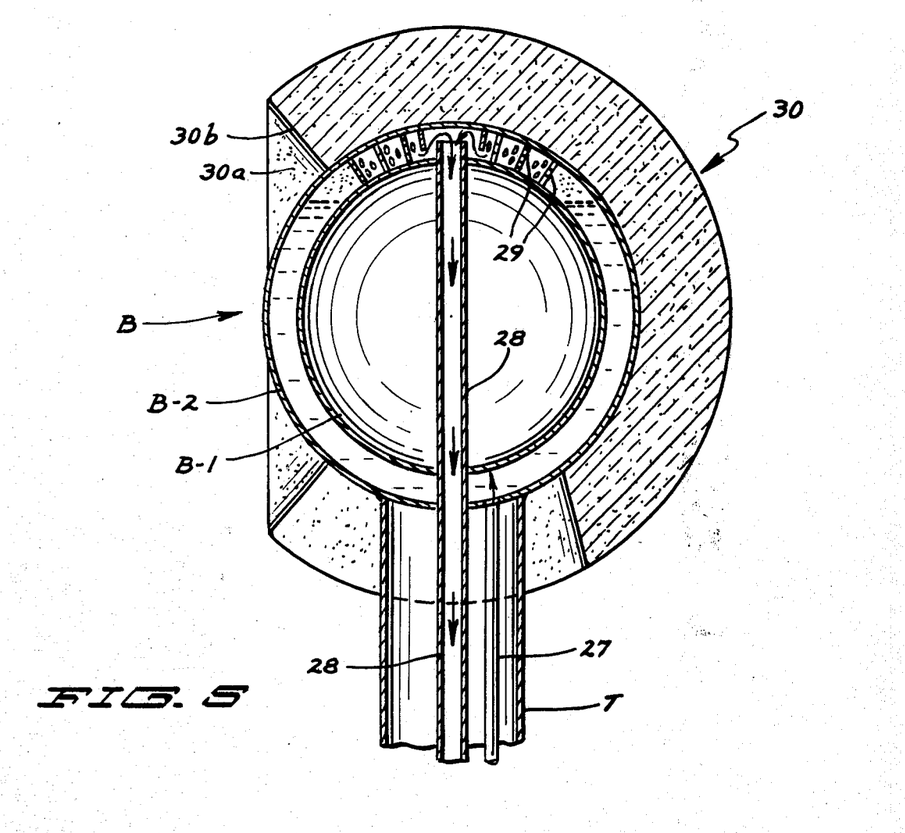
FIG. 5 is a vertical cross section taken approximately on the line 5—5 of FIG. 4.
Figures 6, 7, 8:
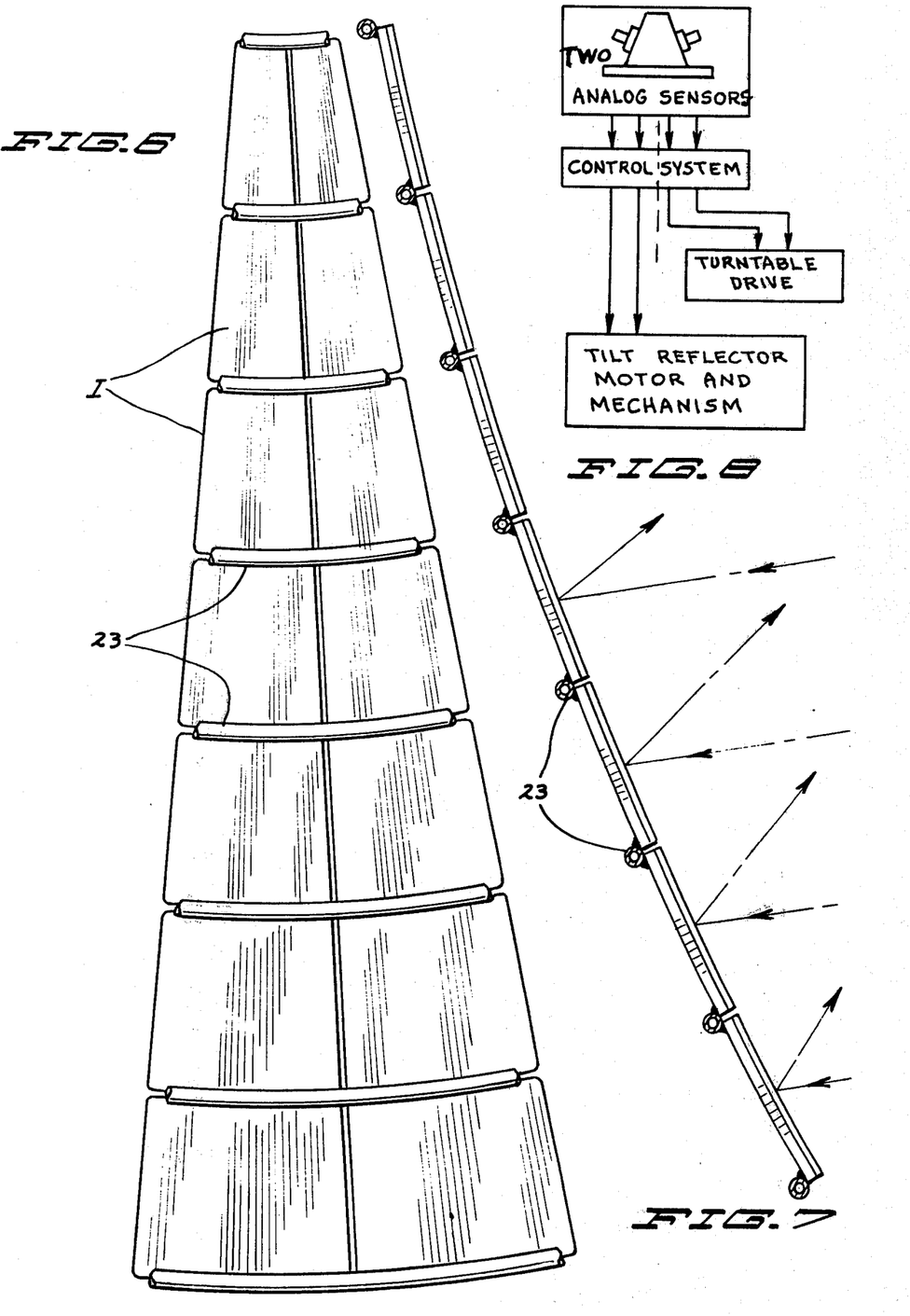
FIG. 6 is a rear elevational view, on a larger scale, showing one longitudinal section only of a form of satisfactory reflector unit and frame removed from the overall reflector unit.
FIG. 7 is a side elevation of the same reflector segment.
FIG. 8 is a diagrammatic view indicating one analog sensor and its relation with control system and the motor actuating means.

While a number of forms of an overall generally parabolic, multi-section reflector unit may be successfully employed, the one disclosed in this embodiment of the invention, as shown in FIGS. 1, 2, 3, and in detail in FIGS. 6 and 7 of the drawings, comprises a rigid backing structure, indicated as an entirety by the letter S, consisting in a multiplicity of concentric generally circular supports 23 which, while concentric, are successively, from the smallest element 23, disposed inwardly to \in general define a concave and generally parabolic backing structure. Said circular backing members 23 are suitably interconnected in rigid formation as by a plurality of bowed rigid backing rods 24 and laterally disposed rigid transverse and curved rods 25. The terminal portions of the rigid backing rods 24 and 25 are integrally formed with or rigidly connected with a plurality of inwardly converging rigid support rods 26 which have terminals bolted or otherwise rigidly secured at the sides of the overall structure to the said heavy end discs 21 and 22. As shown in most of the general views, and in detail in FIGS. 6 and 7, a multiplicity of flat individual reflectors is employed fitted and supported between the circular backing members 23. The multiplicity of flat reflectors I for each longitudinal section of the reflector unit, as shown in FIGS. 6 and 7, increase in length and increase in width from centermost edges of the overall reflector unit R to the outer peripheral edge thereof. A central opening O is formed in the reflective surface.

A stationary generally spherical boiler, indicated as an entirety by the letter B, is disposed axially (by vertical axis) of the orbital travel of the turntable 11 as well as axially (by horizontal axis) to the oscillatory mountings for the overall reflector unit R. The stationary mounting for the immovable boiler B may be from overhead by suspension, but preferably constitutes a substantially vertical tubular tower or post T which extends axially of the turntable 11 and the exterior of which is surrounded for free revolution of the turntable. The tubular tower T, for installation mounting purposes, may extend below ground or supporting floor level and contains a relatively small diameter fluid return conduit 27 which may be connected, not shown, with a recirculating fluid system for returning cooled fluid to the lower interior of the boiler B. A larger vertical conduit 28, as shown disposed axially of the tubular tower T, transfers from the topmost and hottest part of the two-wall spherical boiler, fluid in a downward direction.

The boiler B, as shown, has an inner preferably insulated spherical wall B-1 and a concentric outer heat-absorbing wall B-2. Apertured, substantially radially extending scrubber plates 29 are provided in the hot upper portion of boiler B interiorly thereof to break up the bubbles and the like which may be formed during the intense heating of the circulating fluid. Several liquids or vapors may be employed in the circulating system of the boiler, such as water or mercury.

A shield member or shutter 30, in the form of a generally spherical, thick solid substance having highly efficient heat-insulating material, smoothly, movably and slidably surrounds the exterior wall B-2 of the spherical boiler, and has a circular exposure recess or window 30a formed therein by an inwardly tapering edge 30b. This shield member 30 has actuating connections with some moving component for gyrating the apertured shield 30 in synchronization with the travel and swinging of the reflector unit during cycle of operation of the system. The simple and preferred actuating connections consist, as shown, in the embodiment illustrated, in the attachment of the converging reflector unit rods 26 to the shield at suitable points thereon.

A heavy accurately weighed and positioned counterweight W, as shown, is affixed to the swingable trunnion and mounting structure for the reflector unit backing frame S and is effective to accurately overcome and balance the weight of the reflector unit and its backing and supporting parts.

In the embodiment of the invention shown and described herein (see FIGS. 1 and 2), the downward swinging of the large reflector unit to the dotted line position shown in FIG. 1, requires that the lower edges or periphery of the reflector be disposed below and beyond the upright supporting tower T upon which the immovable boiler B is supported. To enable such an essential swinging action of the reflector unit to properly track the sun during its positioning near, at and below azimuth, a V-shaped sector V is cut out or omitted in the overall construction of the general reflector unit. This V-shaped recess is dimensioned at its vortex portion to straddle and move clear of the tower T. For similar reason, the appropriate and lower portion of the insulated shield or shutter 30 for the boiler is recessed or slotted at 30c.

Sun-sensor controlled mechanism is provided for variably tilting inwardly and upwardly the overall reflector unit R. As shown, see FIG. 2, the right hand trunnion 16 of the reflector unit is rigidly affixed or keyed to the heavy disc 22 and is revolubly and reversibly driven by suitable transmission housed within the motor housing MH which also contains a motor M shown in dotted lines, electrically connected by conductor C with the output of a suitable sun sensor which tracks the elevational travel of the sun day-by-day in its overall trajectory. The take-off of the reversible electric motor is by worm gear or otherwise suitably connected for driving the trunnion 16 and consequently for swinging upwardly and downwardly and responsive to sensor control reflector unit R.

Mechanism is provided, synchronized with the variable, day-by-day longitudinal increment of the sun's trajectory for revolving the platform 11 upon the track 13. As shown in the embodiment illustrated this may take the form of a variable speed electric motor MM having suitable transmission housed in a housing 33 and having a driven pinion 34 which is meshed with a circular bull gear 35 affixed to the peripheral and upper portion of the platform 11.

It will be understood that the overall reflector unit, comprising a great multiplicity of prearranged and flat reflectors I, provides a substantially parabolic reflective surface having a center axis A which, in all up and down swinging movements of the reflector in operation, passes through the center of the spherical boiler B. Thus in all varying positions of the reflector in its orbital travel and compounded up and down swinging movement, during operation of the system, intensity of reflected solar rays is achieved on the varying exposure areas of the spherical boiler. Such intensity is diagrammatically shown in FIG. 3, which is a vertical section taken on the line or plane 3—3 of FIG. 1. Horizontal arrows directed from right to left represent solar rays emanating from the sun at approximately sunrise striking the myriad of small planar reflectors which make up the parabolic overall reflector surface R. The diagonal arrows from the various reflector elements strike the exposed area of the boiler at approximately two points (upper and lower). These diagonal arrows represent individual reflected rays all from approximately centers of individual reflector plates and of course all reflected from a vertical line only.

Myriads of other reflected solar rays will be intensified in immediately adjacent and successive portions of the exposed areas. Such intensities to a large extent fill the exposed area extending successively to the sides of the intensified points of FIG. 3 and also upwardly and downwardly of the reflected area. The central opening O in the parabolic overall reflective surface is of substantially equal diameter to the diameter of the spherical boiler B and is focally aligned therewith in all the variable tilted and planetary positions of the reflector unit R during operation.

The positional relationship of the reflector unit R with the stationary boiler B supported on the tower T with limitation of upward tilting of the reflector with the center line disposed substantially in horizontal alignment with the center of boiler B and with provision of downward swinging of the reflector in its orbital travel through approximately 90° is accountable for commercially very significant, new and improved results. A more efficient collection of reflected solar rays is assured as contrasted with prior art systems and furthermore the entire apparatus and its dimensions in height and circumference are very substantially less than any prior art known to applicant.

The motor MM for progressively driving the turntable 11 is selectively operated from elements and components contained in a control system which is in turn responsive to one of two analog sensors or heliostats as diagrammatically shown in FIG. 8. A second sun sensor throws into operation and senses the components and controls of the control system as indicated in FIG. 8 for energizing (forward and reverse) the tilt reflector motor M.

Such sun sensors are heliostats with cooperating circuitry are well known in the art as for example, in certain devices manufactured and sold as analog sensors by Adcole Corporation of Waltham, Mass., and by Carson Astronomical Instruments of Valencia, Calif. In the model system of Adcole Corporation the analog output of the system is zero when pointing directly at the sun; is positive on one side of the sun and negative on the other side of the sun. The motor drive controller will drive the system in the appropriate direction when the sensor output is zero.

OPERATION AND SUMMARY

It will be understood that the analog sensors for tracking the sun, the overall control system which is responsive to said sensor and the output electrical connections from said control systems may be utilized in one general control for properly controlling and causing actuation of a plurality of applicant's systems and apparatus.

It will further be understood that with a computer in the control system, see FIG. 8, a complete orbit of the turntable 11 through its circular path may be controlled after the heliostat or sun sensor is phased out through setting of the sun to return the turntable supported on track 13 to the position where it started travel at sunrise of a particular day. Ordinarily in the operation of a large plant which may comprise many of applicant's systems, at least one operator is needed, and thus being the case, a pushbutton control of a circuit energizing the motor MM at high speed can quickly bring the turntable to the precise starting point for the particular calendar day. To this end the operator can, by indicia placed upon the external periphery of the turntable, see the appropriate calendar starting point for the next day's operation, and by push button may readily bring the turntable to such point whereafter sun sensor control takes over.

Upon rising of the sun one of the analog sensors, diagrammed in FIG. 8, takes over and through its appropriate control system produces the essential controlled operation of motor M for gradually tilting the parabolic reflector unit R. The second sensor, as indicated in FIG. 8, in tracking the linear travel of the sun in east to west direction produces the required operation of the motor MM for revolving the turntable in synchronism with the east to west travel of the sun.

It will be apparent that, throughout the orbital travel of the reflector unit R and the up and down tilting movement thereof, the constant positional variance of the shield 30 from sunrise position is predetermined and always the focus of the cumulative reflective area of the unit R is focused upon the exposure area of the shield 30. The constant slow shifting of the shield or shroud 30 is accomplished substantially without friction in the operation of my system. As previously recited, the immovable or stationary boiler B mounted with its horizontal axis substantially aligned with the center line A of the reflector unit when said unit is disposed in substantially horizontal position is of great importance. This compact arrangement and combination is responsible for previously unknown concentration of space for accommodating the entire system. The same combination assures high and constant efficiency of concentrated reflected solar rays upon the constantly varying exposed exterior area of boiler B.

It will be understood that the aperture or window of the shroud or shield 30 may be transversely provided with a partition of a material which will freely transmit passage of reflected solar rays while heat-shielding radiation of heat from the spherical absorptive exterior of boiler B.

In accordance with my calculations and small-scale experiments, I have determined that with the improved new structure and relationship of the components of my system temperatures of the mercury or other vapor at the topmost takeoff position of boiler B exceed 1800° F. From the topmost takeoff interior of the boiler B the hot vapor flows downwardly through takeoff conduit 28, positioned in well insulated relation, and said hot vapor may thereafter be passed through heating coils of a boiler or other medium or to storage. When the heat is removed from such coils, the cooled liquid is returned upwardly through the smaller conduit 27 into the bottom portion of the hollow boiler B. In such a circulatory system a pump or injector is usually essential to produce the desired circulation of fluid.

My new and improved results include, in combination with the other essential components, an immovable highly efficient boiler structure extending at relatively low level which makes possible permanent and moisture-proof connections with a power plant which may service a plurality or multiplicity of my solar ray collecting systems. The prior art fails to show, in a compact functional relation, reflective, orbitary-travel reflectors and boilers in a combinative structure which will produce my improved functions and which will immovably locate an efficient boiler concentrically of orbital travel as well as tilting oscillation of a reflector.

What is claimed is:

1. An earth-based, sun-tracking system for collecting and utilizing solar energy having in combination:
    a reflector-supporting medium mounted on earth or orbital travel through a curvilinear path extending transversely to the vertical,
    means synchronized with the horizontal increment of the sun's trajectory for driving said supporting medium through its orbital travel,
    a substantially parabolic, solar ray reflector mounted on said supporting medium for up and down swinging movement on a substantially horizontal axis, reversible driving means controlled by the elevational increment of the sun's trajectory for swinging said reflector during its orbital travel to constantly focus said reflector on the sun between sunrise and sunset, and a stationary solar generator mounted independently of said reflector-supported medium and having a generally spherical exterior surface constructed of material for absorbing solar rays and having a substantially vertical center line disposed axially of the travel orbit of said supporting medium, said generator having a horizontal center line disposed elevationally at least close to the horizontal axis of said reflector, whereby oscillation of said reflector through somewhat in excess of 90° between lowest swinging movement at sun's highest elevational position and uppermost swinging position at sunrise and sunset will provide for focusing of said reflector on the sun during substantially a full day of the sun's trajectory.

2. The structure and combination set forth in claim 1 and an upstanding stationary support for said heat generator disposed concentrically of the orbital travel of said supporting medium.

3. The structure and combination set forth in claim 2, further characterized by a slotted portion extending radially downward in said reflector for accommodating said stationary support to permit downward swinging of said reflector unit to a maximum of at least 90° from its uppermost swinging position.

4. The structure and combination of claim 1, wherein the positional relation of the parabolic reflective area of said reflector unit and said spherical heat generator is such that the axial center line of said unit passes substantially horizontally through the center of said generator in uppermost swinging of said unit, and said reflective area is always in focus with the exposure aperture of said shroud during operation of the system.

5. The combination and structure set forth in claim 1 wherein: a shroud and shielding member symmetrical to the upper portion of said exterior spherical surface of said generator is provided having a substantially circular exposure aperature for variably exposing areas of the exterior generator during operation of said system, said shroud and shielding member being freely movable upon the exterior surface of said generator, and connecting means between and shielding member for variably positioning said shielding member during orbital and oscillating movements of said reflector.

6. The structure and combination set forth in claim 5, and rigid connection and supporting means between said reflector unit and said shroud for precisely supporting said shroud in concentric relation with said spherical generator during orbital and tilting variations of said reflector unit during the operation of said system.

7. The structure and combination set forth in claim 5 wherein said connections constitute substantially rigid elements extending radially inwardly of said reflector for attachment of said shroud.

8. For use with sun-tracking sensor means and circuit-controlling systems responsively operated by said means, a system for collecting and utilizing solar energy having in combination:

a reflector-supporting medium mounted for orbital travel through a substantially circular horizontal path, a large substantially parabolic reflector unit mounted on said support for swinging oscillation thereon upon a substantially horizontal axis, a stationary, solar ray, heat-absorbing medium having a substantially horizontal axis disposed coaxially of the said axis of the reflector unit and having also a substantially vertical axis coaxial with the axis of orbital travel of said mounting medium, said heat-absorbing medium having a generally spherical exposure area, generally spherical shielding means covering the exposure area of the heat-absorbing medium having an exposure opening through which reflected solar rays may pass, means synchronizing movement of said shielding means upon the overall spherical exposure area of said heat-absorbing medium with the orbital and tilting movement of the said reflector unit, mechanism for producing orbital travel of said mounting in synchronism with the linear horizonal trajectory of the sun between sunrise and sunset, and a reversible motor for oscillating said reflector unit.

9. The structure and combination set forth in claim 8 wherein the positional and focal relationship of said reflector unit and said heat-absorbing medium is such that in uppermost, swingable oscillation of said reflector unit its axial center line extends through the center of said heat-absorbing medium along a substantially horizontal line, and where the focus of said total reflective area is upon said exposure opening throughout the operation of said system.

10. The structure and combination set forth in claim 8 wherein said means synchronizing movement of said shielding means comprises connections between said reflector unit and said shielding means.

* * * * *